(12) United States Patent
Hicks et al.

(10) Patent No.: US 12,397,439 B2
(45) Date of Patent: Aug. 26, 2025

(54) WHEEL ASSEMBLY SYSTEM AND METHOD

(71) Applicant: Android Industries LLC, Auburn Hills, MI (US)

(72) Inventors: Joshua J. Hicks, Grand Blanc, MI (US); Kerry A. Verran, Davison, MI (US); Anthony W. Pierce, Owosso, MI (US); John M. Lehman, Royal Oak, MI (US); John E. Donnay, West Bloomfield, MI (US); Christopher M. Bulliner, Flushing, MI (US)

(73) Assignee: Android Industries LLC, Auburn Hills, MI (US)

( * ) Notice: Subject to any disclaimer, the term of this patent is extended or adjusted under 35 U.S.C. 154(b) by 49 days.

(21) Appl. No.: 18/497,509

(22) Filed: Oct. 30, 2023

(65) Prior Publication Data

US 2024/0139964 A1    May 2, 2024

Related U.S. Application Data

(60) Provisional application No. 63/421,316, filed on Nov. 1, 2022.

(51) Int. Cl.
| | |
|---|---|
| *B25J 11/00* | (2006.01) |
| *B23P 21/00* | (2006.01) |
| *B25J 9/00* | (2006.01) |
| *B25J 15/00* | (2006.01) |
| *B23Q 3/06* | (2006.01) |
| *B60C 23/04* | (2006.01) |
| *B60C 29/02* | (2006.01) |

(52) U.S. Cl.
CPC ........... *B25J 11/005* (2013.01); *B23P 21/004* (2013.01); *B25J 9/0087* (2013.01); *B25J 9/0096* (2013.01); *B25J 15/0019* (2013.01); *B25J 15/0028* (2013.01); *B23Q 3/061* (2013.01); *B60C 23/0498* (2013.01); *B60C 29/02* (2013.01); *Y10T 29/49998* (2015.01)

(58) Field of Classification Search
CPC .... B25J 9/0096; B25J 11/005; B25J 15/0019; B25J 15/0028; B23P 21/004; B60C 23/0498; B60C 29/02; B23Q 3/061; Y10T 29/49998
See application file for complete search history.

(56) References Cited

U.S. PATENT DOCUMENTS

| | | |
|---|---|---|
| 5,007,784 A | 4/1991 | Genov et al. |
| 5,765,444 A | 6/1998 | Bacchi et al. |

(Continued)

FOREIGN PATENT DOCUMENTS

| | | | | |
|---|---|---|---|---|
| CN | 204308486 U | * | 5/2015 | |
| DE | 102006000721 A1 | * | 8/2006 | ............... B23Q 7/04 |
| GB | 2336693 A | * | 10/1999 | ............ B23P 19/001 |

*Primary Examiner* — Jermie E Cozart
(74) *Attorney, Agent, or Firm* — Miller Johnson

(57) ABSTRACT

A system comprises a docking station and a robot. The docking station includes a first dock and a second dock. The first dock is configured to removably-receive a first plate. The first plate is configured to removably-receive a first plurality of parts. The second dock is configured to removably-receive a second plate. The second plate is configured to removably-receive a second plurality of parts. The robot includes an end effector configured to engage the first plate and the second plate.

7 Claims, 8 Drawing Sheets

(56) References Cited

U.S. PATENT DOCUMENTS

| | | | |
|---|---|---|---|
| 6,121,743 A | 9/2000 | Genov et al. | |
| 7,833,351 B2 | 11/2010 | Webb et al. | |
| 8,308,529 B2 | 11/2012 | D'Ambra et al. | |
| 2012/0065779 A1* | 3/2012 | Yamaguchi | B25J 9/1612 |
| | | | 294/213 |
| 2013/0091699 A1* | 4/2013 | Kim | B21D 19/04 |
| | | | 29/243.57 |
| 2016/0089755 A1* | 3/2016 | Kogushi | B25J 9/023 |
| | | | 29/430 |
| 2021/0402535 A1* | 12/2021 | Teramoto | F01D 25/285 |

* cited by examiner

WHEEL ASSEMBLY SYSTEM AND METHOD

CROSS-REFERENCE TO RELATED APPLICATIONS

This application claims the benefit of U.S. Provisional Application No. 63/421,316 filed Nov. 1, 2022, the disclosure of which is considered part of the disclosure of this application and is incorporated herein by reference in its entirety.

TECHNICAL FIELD

This disclosure relates generally to a system and method for assembling a wheel, and more particularly to a dual-staged system and method for assembling a wheel.

BACKGROUND

This section provides background information related to the present disclosure and is not necessarily prior art. Wheel assemblies may include a wheel, a valve stem and/or a tire pressure monitoring system (TPMS) sensor. Known wheel assembly systems include (i) a tool that engages a valve stem and assembles the valve stem through an aperture formed in a wheel, and (ii) another tool that engages a TPMS sensor and assembles the TPMS sensor through an aperture formed in a wheel. Accordingly, known wheel assembly systems may include a first station for staging a valve stem for receipt by a first tool, and a second station for staging receipt of a TPMS sensor for receipt by a second tool. In known methods of assembling a wheel, the first and second tools may operate to receive the valve stem and the TPMS sensor, respectively, and install the valve stem and the TPMS sensor relative to the wheel. While known wheel assembly systems and methods have proven acceptable for their intended purposes, a continuous need for improvement in the pertinent art exists.

SUMMARY

This section provides a general summary of the disclosure, and is not a comprehensive disclosure of its full scope or all of its features.

One aspect of the disclosure provides a system. The system comprises a docking station and a robot. The docking station includes a first dock and a second dock. The first dock is configured to removably-receive a first plate. The first plate is configured to removably-receive a first plurality of parts. The second dock is configured to removably-receive a second plate. The second plate is configured to removably-receive a second plurality of parts. The robot includes an end effector configured to engage the first plate and the second plate.

Implementations of this aspect of the disclosure may include one or more of the following optional features. In some implementations, the first dock includes a first attachment fixture and a second attachment fixture. The first attachment fixture may be configured to receive a first part of the first plurality of parts. In some implementations, the second attachment fixture is configured to receive a second part of the first plurality of parts.

In some implementations, the first dock includes a base and a pair of arms extending from the base. The first dock may include a sensor coupled to the base and configured to sense a location of the first part.

In some implementations, the end effector includes a first engagement member and a second engagement member. The first engagement member may be configured to engage the first plate. The second engagement member may be configured to engage the second plate when the first engagement member engages the first plate.

In some implementations, the system comprising the first plate includes a first peripheral tab and a second peripheral tab. The first dock may include a first attachment fixture and a second attachment fixture. The first attachment fixture may be configured to receive the first peripheral tab. The second attachment fixture may be configured to receive the second peripheral tab. In some implementations, the robot further comprises a first alignment device and a second alignment device. The first alignment device may oppose the first peripheral tab. The second alignment device may oppose the second peripheral tab.

In some implementations, the first plurality of parts includes a first type of part, and the second plurality of parts includes a second type of part different than the first type of part.

Another aspect of the disclosure provides a method. The method may include positioning, with a first robot, a first part on a first plate disposed at a docking station. The method may also include securing a second robot to a second plate disposed at the docking station. The method may further include installing, with the second robot, a second part on a wheel. The method may also include releasing the second robot from the second plate at the docking station. The method may further include securing the second robot to the first plate at the docking station.

Implementations of this aspect of the disclosure may include one or more of the following optional features. In some implementations, installing, with the second robot, the second part on the wheel is simultaneous with positioning, with the first robot, the first part on the first plate.

In some implementations, securing the first plate to the second robot is simultaneous with releasing the first plate from the second robot.

In some implementations, installing, with the second robot, the second part on the wheel includes applying, with the second robot, a first force in a first direction on the wheel, and applying, with the second robot, a second force in a second direction on the wheel, wherein the second direction is opposite the first direction.

In some implementations, the method further comprises sensing a location of the first part.

In some implementations, the method further comprises installing, with the second robot, a third part on the wheel. The method may further comprise simultaneously (i) positioning, with the first robot, a fourth part on the first plate disposed at the docking station and (ii) installing, with the second robot, the third part on the wheel.

In some implementations, the first part is a first type of part, and the second part is a second type of part different than the first type of part.

Yet another aspect of the disclosure provides a docking assembly. The docking assembly includes a first dock, a first plate, a second dock, and a second plate. The first plate is removably-disposed on the first dock and includes a first nest and a second nest. The first nest and the second nest are each configured to removably-receive a first part and a second part. The second plate is removably-disposed on the second dock and includes a third nest and a fourth nest. The third nest and the fourth nest are each configured to removably-receive the first part and the second part.

Implementations of this aspect of the disclosure may include one or more of the following optional features. In some implementations, the first plate includes a first peripheral tab and a second peripheral tab, the first nest is disposed on the first peripheral tab, and the second nest is disposed on the second peripheral tab.

In some implementations, the docking assembly further includes a first sensor and a second sensor. The first sensor may be configured to sense a position of the first nest. The second sensor may be configured to sense a position of the second nest.

In some implementations, the first dock includes a first attachment fixture having a first base and a first pair of arms extending from the first base. The first sensor may be disposed on the first base. The second dock may include a second attachment fixture having a second base and a second pair of arms extending from the second base. The second sensor may be disposed on the second base.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
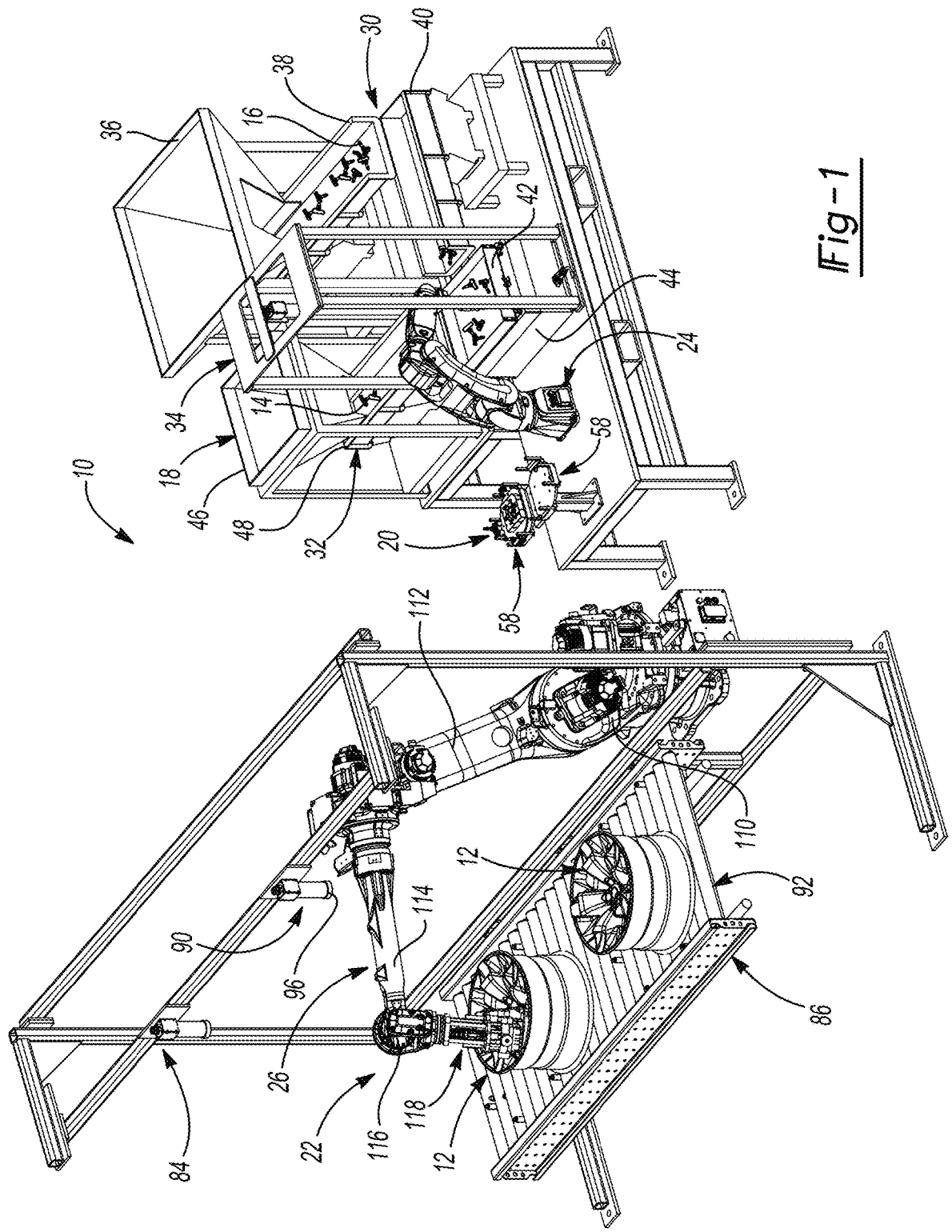
FIG. 1 is a perspective view of a wheel assembly system according to the principles of the present disclosure.

Referring to FIG. 1, a wheel assembly system 10 may be utilized to assemble various components relative to a wheel 12. In this regard, while the system 10 is generally shown and described herein as being utilized to assembly valve stems 14 and tire pressure sensors 16 relative to the wheel 12, it will be appreciated that the system 10 may be utilized to assemble, or otherwise provide, other components (e.g., weights, soap, etc.) to the wheel 12.

Figure 3:
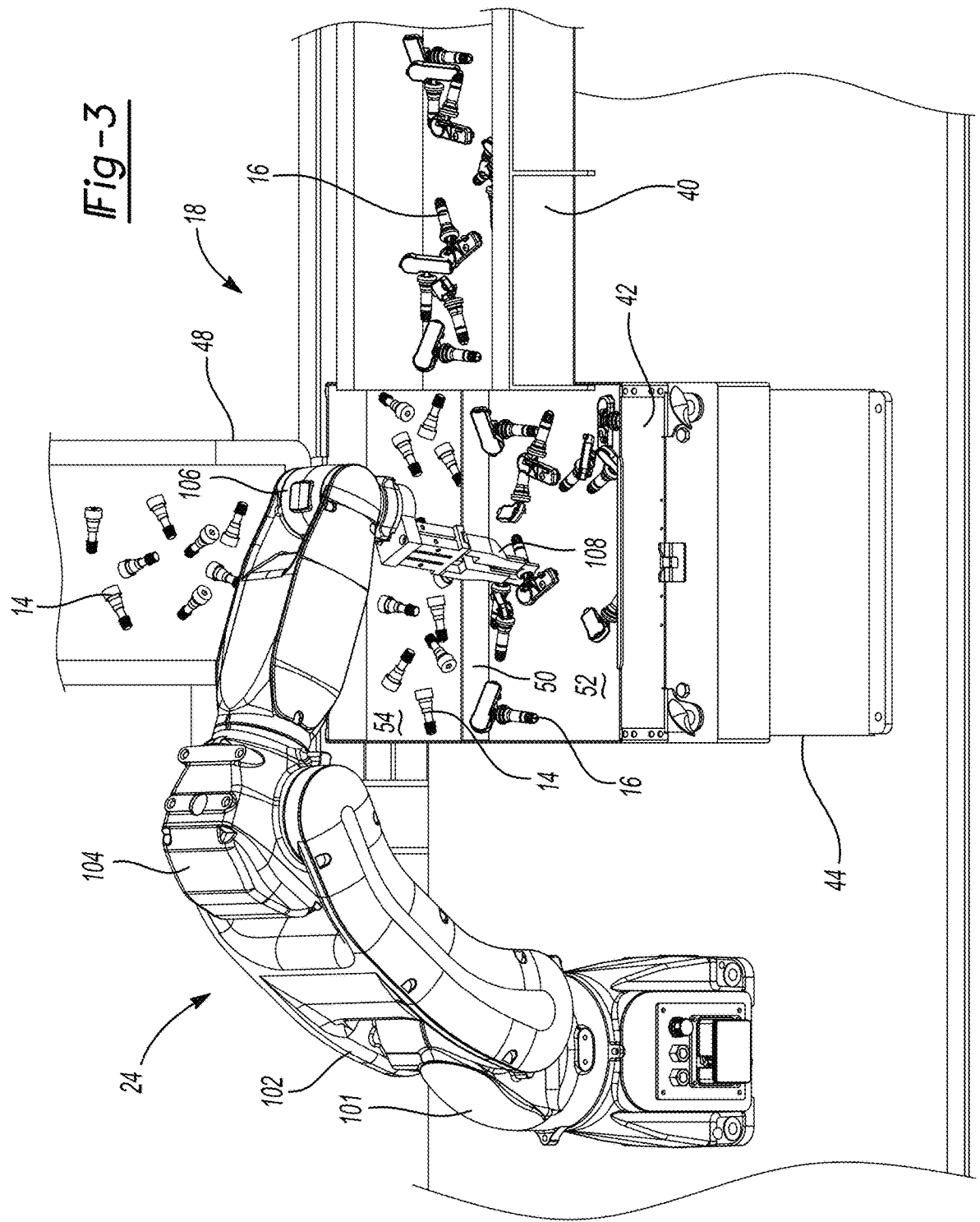
FIG. 3 is a perspective view of a portion of the loading station and first robot of FIG. 2.

The system 10 may include a loading station 18, a staging station 20, an assembly station 22, a first robot 24, and a second robot 26. The loading station 18 may include a first hopper system 30, a second hopper system 32, and a vision system 34. The first hopper system 30 may include a first hopper 36, a first tray 38 disposed downstream of the first hopper 36, a second tray 40 disposed downstream of the first tray 38, a container 42 disposed downstream of the second tray 40, and one or more vibration mechanisms 44. The second hopper system 32 may include a first hopper 46, a first tray 48 disposed downstream of the first hopper 46, the container 42 disposed downstream of the first tray 48, and the vibration mechanism(s) 44. As will be explained in more detail below, the first hopper system 30 may receive and convey a first component (e.g., tire pressure sensors 16) from the first hopper 36 to the container 42 through gravity and/or vibration produced by the vibration mechanism(s) 44, and the second hopper system 32 may receive and convey a second component (e.g., valve stems 14) from the first hopper 46 to the container 42 through gravity and/or vibration produced by the vibration mechanism(s) 44. As illustrated in FIG. 3, the container 42 may include a divider 50 dividing the container into a first portion 52 that receives the first component and a second portion 54 that receives the second component.

Figure 4:
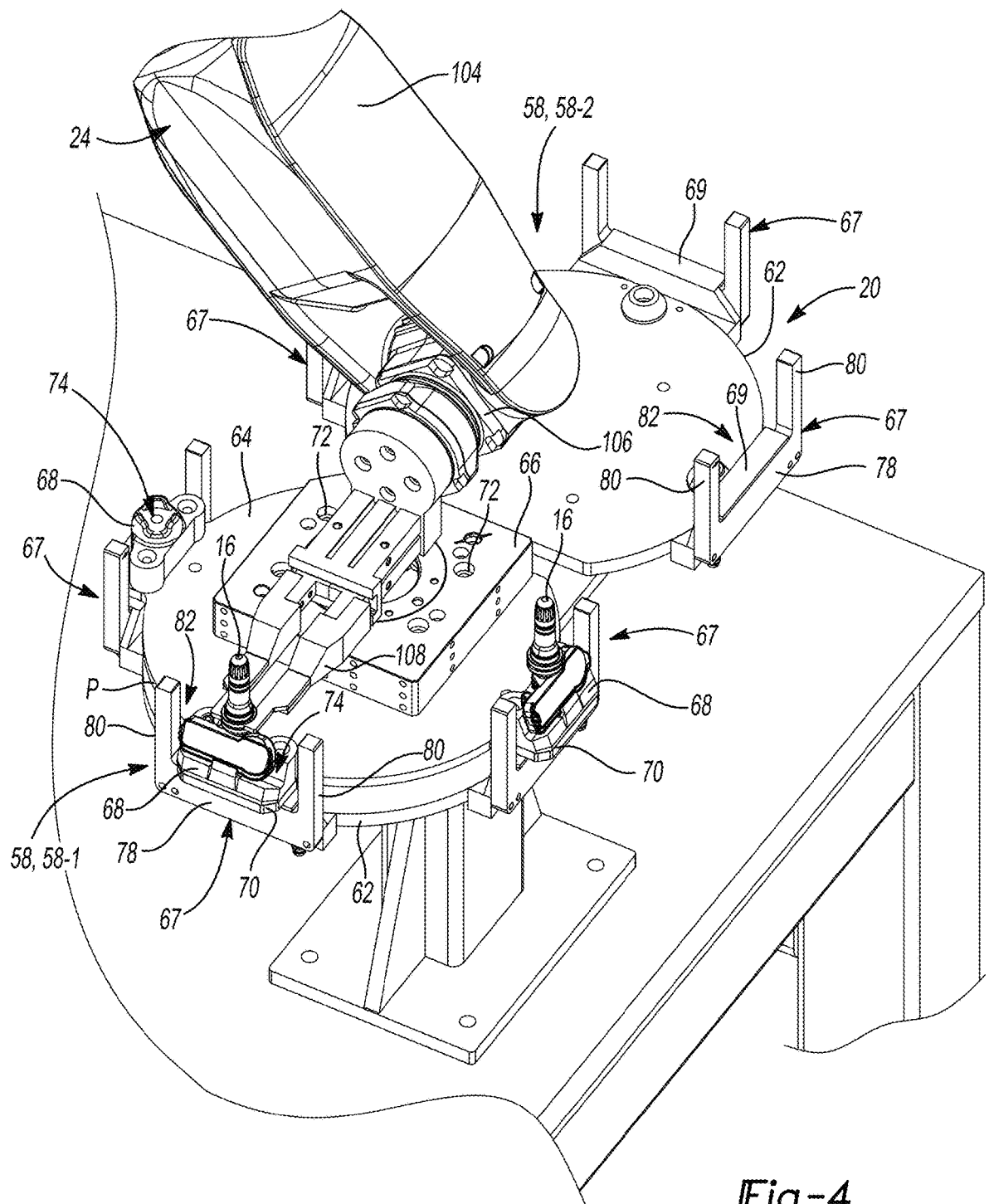
FIG. 4 is a perspective view of a staging station of the wheel assembly system of FIG. 1 and the first robot of FIG. 2, the first robot illustrated in a second orientation according to the principles of the present disclosure.

With reference to FIG. 4, the staging station 20 may include one or more docks 58. Each dock 58 may include a base 62, a plate 64, a robot attachment fixture 66, one or more part attachment fixtures 67, one or more nests 68, and one or more sensors 69. The plate 64 may be removably-disposed on the base 62 and include a one or more tabs 70 extending from a periphery P of the plate 64. The attachment fixture 66 may be disposed on the plate 64 and include one or more apertures 72. Each nest 68 may be disposed on and/or coupled to, the plate 64 (e.g., on a tab 70) and include one or more recesses 74 configured to receive the part (e.g., tire pressure sensors 16 and/or valve stems 14).

In some implementations, each dock 58 includes three attachment fixtures 67 coupled to the base 62. The attachment fixtures 67 may each include a base 78 and a pair of arms 80 extending from the base 78. In some implementations, the arms 80 extend orthogonally from the base 78 and define a gap 82 therebetween. In this regard, the arms 80 and the base 78 may collectively define a U-shape. The sensor 69 may include a proximity sensor or any other suitable sensing device operable to sense the presence of a part (e.g., tire pressure sensors 16 and/or valve stems 14) and/or a nest 68 within the U-shape of a respective attachment fixture 67. In some implementations, the sensor 69 is coupled to the attachment fixture 67. For example, the sensor 69 may be coupled to the base 78.

Figure 7:
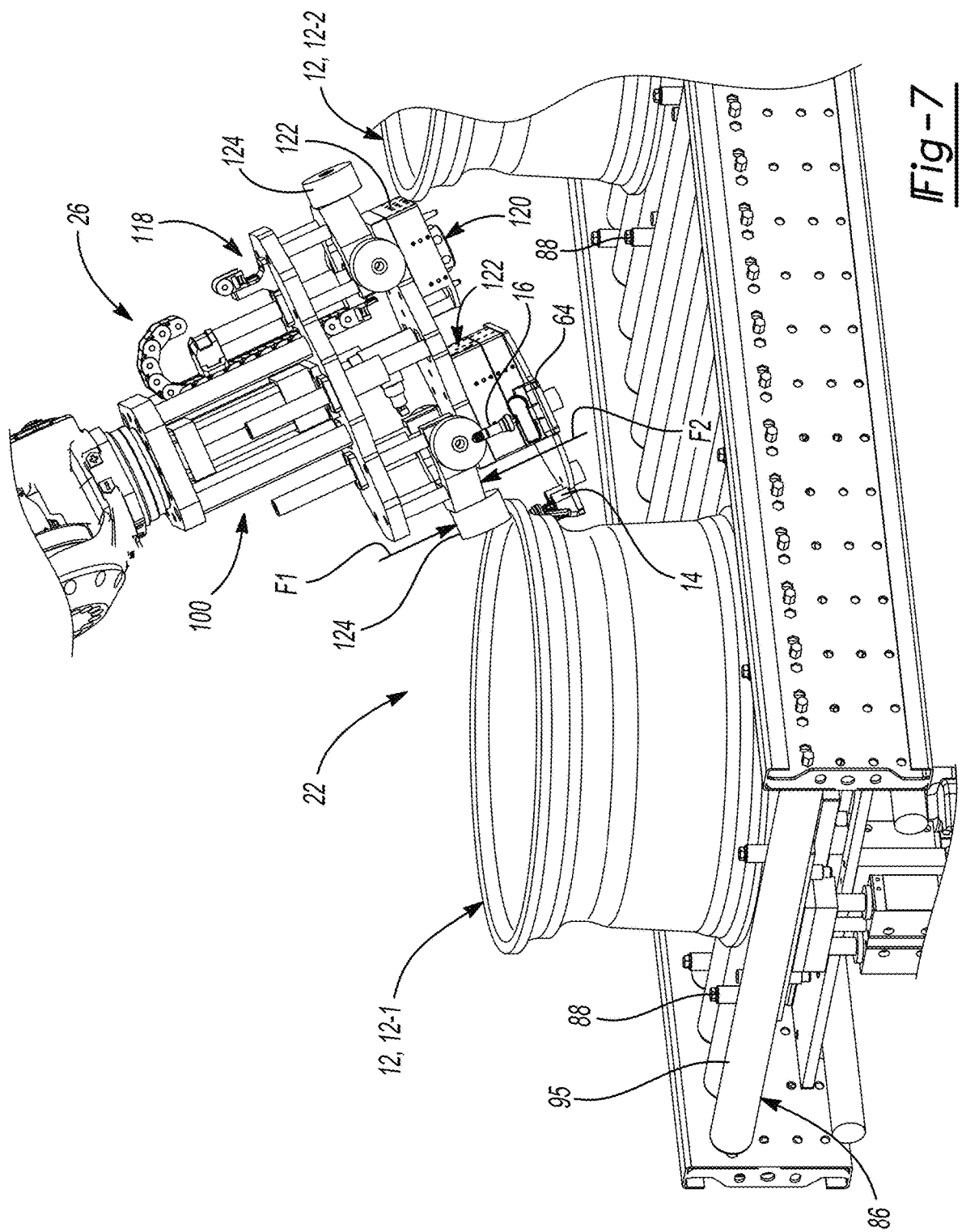
FIG. 7 is a perspective view of the assembly station of FIG. 6 and the second robot of FIG. 5, the second robot illustrated in a third orientation.
Figure 8:
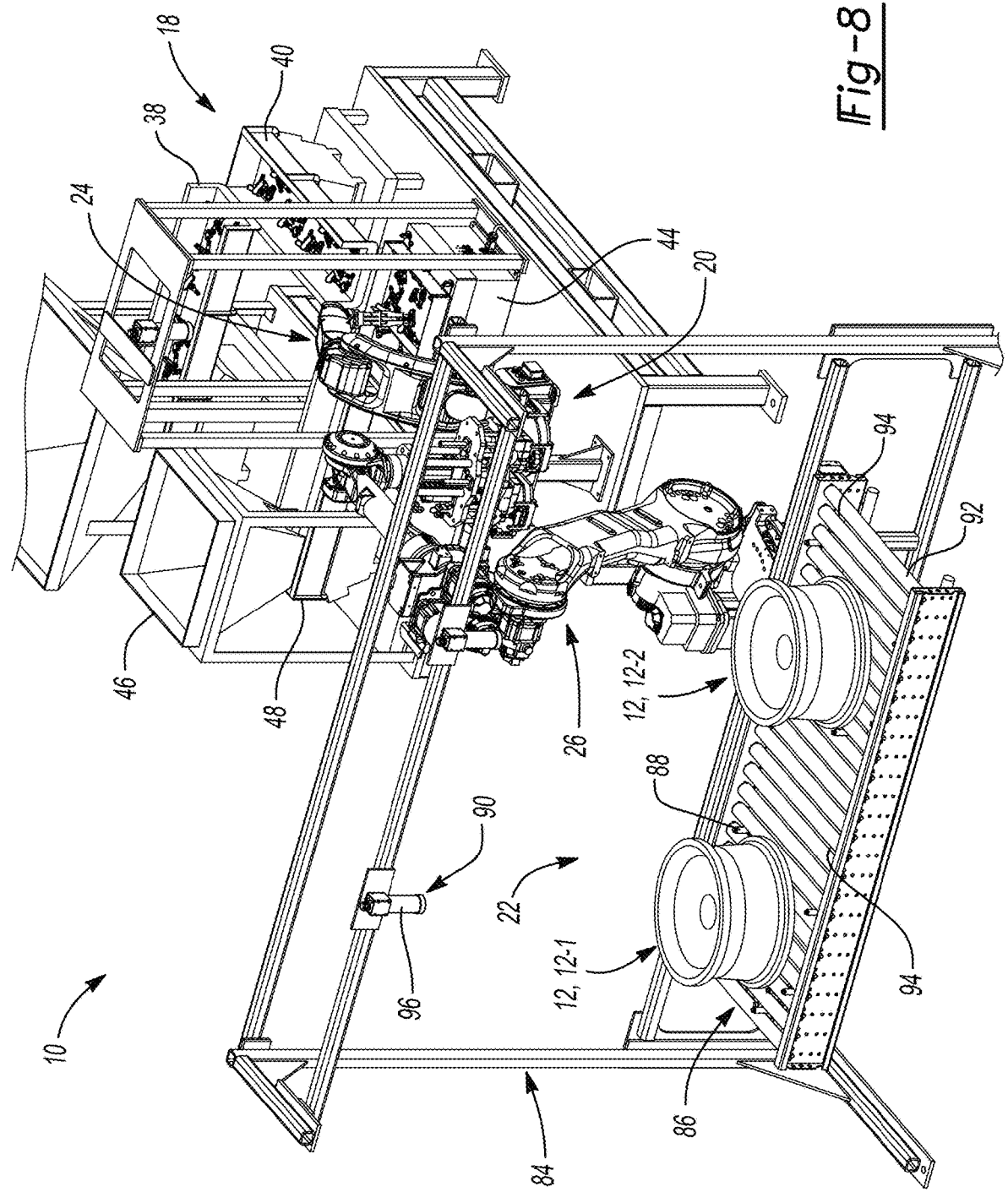
FIG. 8 is a perspective view of the assembly station of FIG. 6 and the second robot of FIG. 5, the second robot illustrated in the first orientation.

With reference to FIGS. 7 and 8, the assembly station 22 may include a frame 84, a conveyor 86, one or more alignment pins 88, and a vision system 90. The conveyor 86 may be supported by the frame and include one or more rollers 92 to receive the wheel 12. The rollers 92 may define one or more gaps 94 therebetween. In some implementations, the rollers 92 include a sleeve 95 disposed around the roller. The alignment pins 88 may be disposed within the gaps 94 and collectively define a circular shape. The vision system 90 may be supported by the frame 84 and include a camera 96.

With reference to FIGS. 3 and 4, the first robot 24 may include a first arm 101, a second arm 102, a third arm 104, a fourth arm 106, and an end effector 108. The first, second, third, and/or fourth arms 101, 102, 104, 106 and/or the end effector 108 may be coupled to, and move (e.g., rotate, pivot, translate, etc.) relative to, one another.

With reference to FIGS. 1 and 5-7, the second robot 26 may include a first arm 110, a second arm 112, a third arm 114, a fourth arm 116, an end effector 118, one or more engagement members 122, and one or more alignment devices 124 (e.g., a rotatable cylinder). The first, second, third, and/or fourth arms 110, 112, 114, 116 and/or the end effector 118 may be coupled to, and move (e.g., rotate, pivot, translate, etc.) relative to, one another. The engagement member(s) 122 may be coupled to the end effector 118. In some implementations, the quantity of alignment devices 124 corresponds to the quantity of nests 68 and/or tabs 70 on the plate 64 to assist with assembly of the parts (e.g., tire pressure sensors 16 and valve stems 14) onto the wheel 12. For example, the second robot 26 may include three alignment devices 124.

Figure 2:
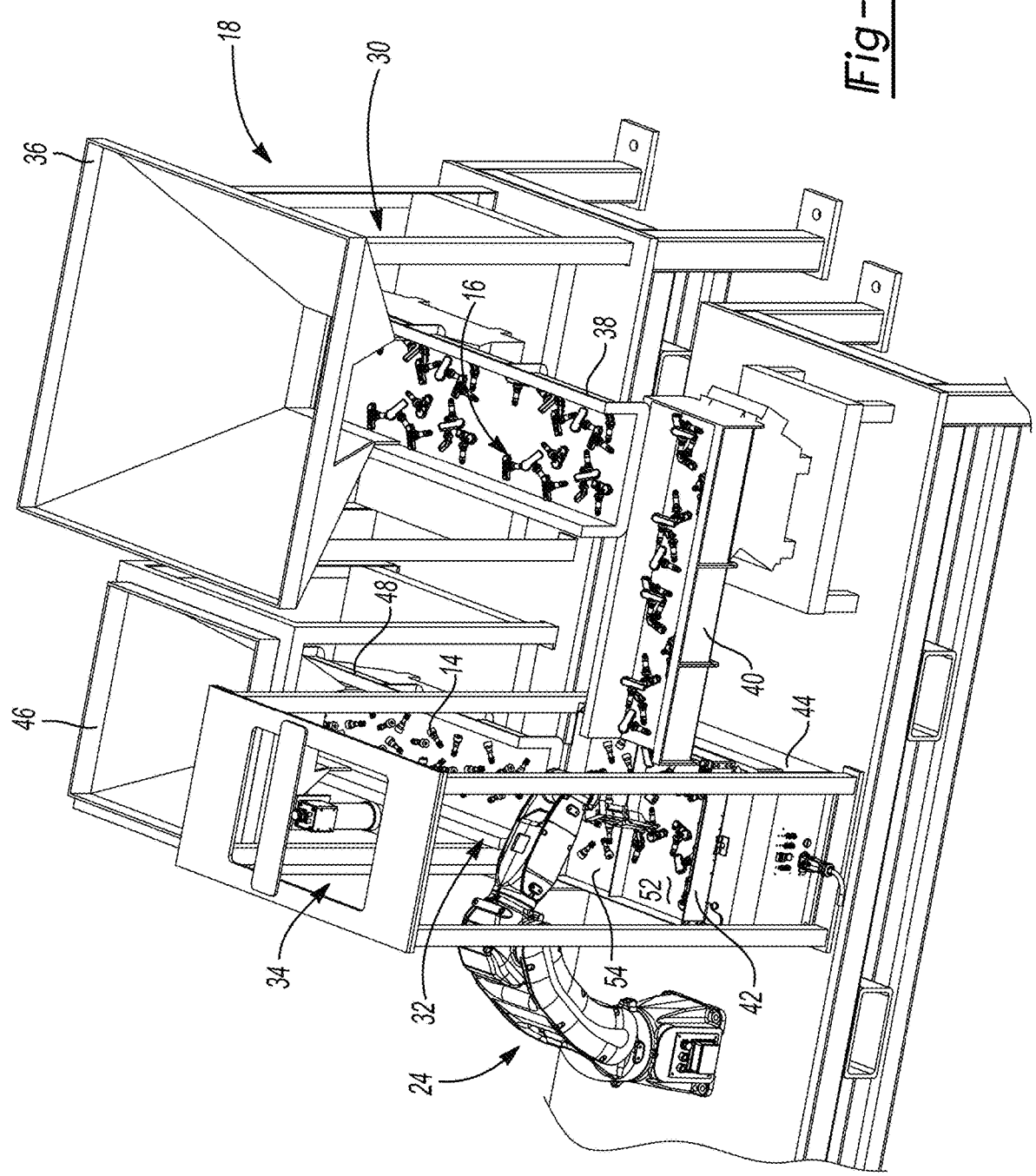
FIG. 2 is perspective view of a loading station and a first robot of the wheel assembly system of FIG. 1, the first robot illustrated in a first orientation according to the principles of the present disclosure.

A method of assembling a wheel (e.g., wheel 12) will now be described relative to FIGS. 1-8. With reference to FIG. 2, the method may begin with an operator (not shown) loading hoppers (e.g., hopper 36 and hopper 46) with parts (e.g., tire pressure sensors 16 and valve stems 14, respectively). One or more of the vibration mechanisms 44 may be disposed under the hoppers (e.g., hopper 36 and hopper 46) and/or the trays (e.g., trays 38, 40, 48) to convey the parts (e.g., tire pressure sensors 16 and valve stems 14) to the container 42 (e.g., the first portion 52 and the second portion 54). Once the parts (e.g., tire pressure sensors 16 and valve stems 14) are received in the first portion 52 and the second portion 54, respectively, the vibration mechanism 44 disposed under the container 42 will manipulate the parts (e.g., tire pressure sensors 16 and valve stems 14) into a pickable position. The vision system 34 (e.g., a camera disposed above the container) may verify that the parts (e.g., tire pressure sensors 16 and valve stems 14) are in a predetermined orientation.

With reference to FIG. 3, once the parts (e.g., tire pressure sensors 16 and valve stems 14) are in a predetermined orientation, the first robot 24 may pick a part (e.g., valve stem 14 or tire pressure sensor 16) from the container 42 and move the part to a lube/soap station (not shown) to apply lubrication (e.g., soap) to at least a portion of the part.

As illustrated in FIG. 4, the first robot 24 may move the part (e.g., valve stem 14 or tire pressure sensor 16) to the staging station 20 and load the part into a nest (e.g., nest 68) and/or attachment fixture 67 of one of the docks 58 (e.g., first dock 58-1). In some implementations, the part is secured to the nest 68 in a press-fit configuration. The first robot 24 may repeat the foregoing steps until parts (e.g., valve stem 14 or tire pressure sensor 16) are disposed within all (e.g., three) of the nests and/or attachment fixtures of the first dock 58-1. While the system 10 and method are generally shown and described herein as including, or otherwise utilizing, the first robot 24 to load the parts into the nests 68, it will be appreciated that the system and method may include, or otherwise utilize, other means (e.g., a human) to load the parts into the nests.

Figure 5:
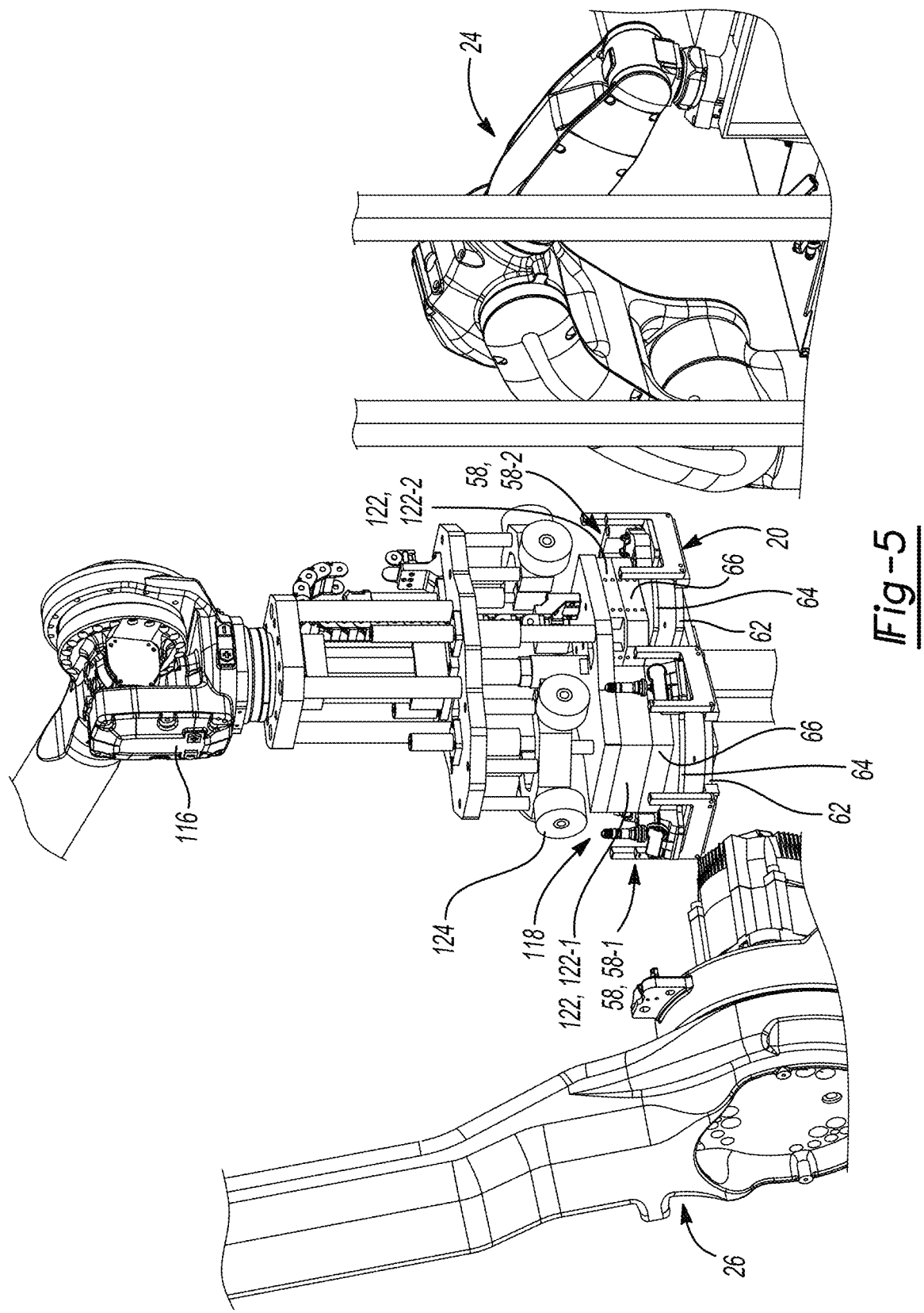
FIG. 5 is a perspective view of the staging station of FIG. 4 and a second robot of the wheel assembly system of FIG. 1, the second robot illustrated in a first orientation.

With reference to FIG. 5, after the first robot 24 loads one or more (e.g., all) of the nests 68 with parts (e.g., valve stems 14 and/or tire pressure sensors 16), the second robot 26 may return one of the plates 64, including one or more empty nests 68, into a dock (e.g., second dock 58-2) and remove another of the plates 64, including one or more nests 68 having loaded parts, from another dock (e.g., first dock 58-1). For example, a second engagement member 122-2 of the engagement members 122 may simultaneously release one of the plates 64 onto the second dock 58-2 while a first engagement member 122-1 of the engagement members 122 removes another one of the plates 64 from the first dock 58-1.

Figure 6:
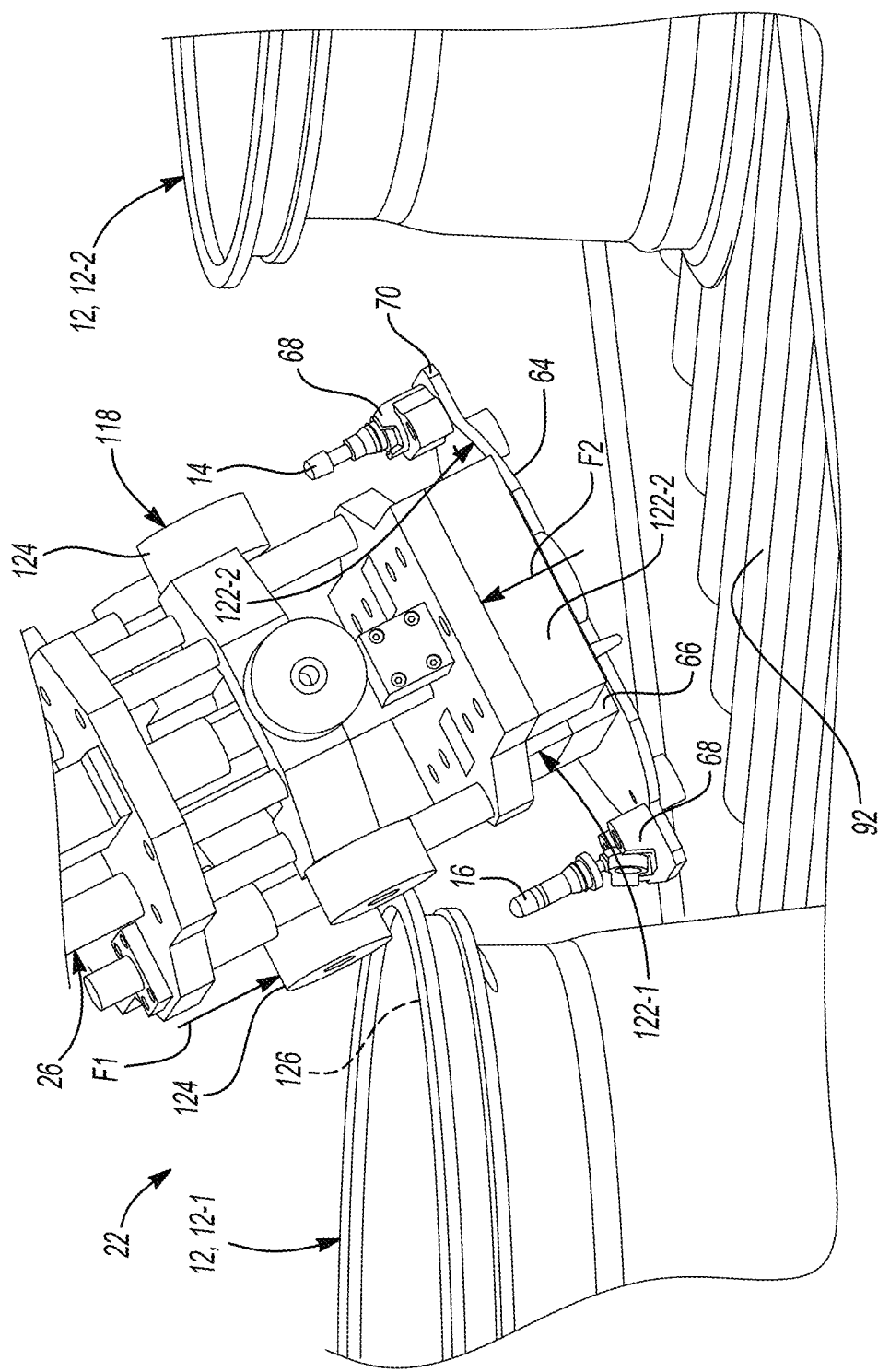
FIG. 6 is a perspective view of an assembly station of the wheel assembly system of FIG. 1 and the second robot of FIG. 5, the second robot illustrated in a second orientation.

With reference to FIGS. 6 and 7, after the second robot 26 removes a plate (e.g., the plate 64) from a dock (e.g., the first dock 58-1), the second robot 26 may move the plate and the parts from the dock to the assembly station 22 and install the part onto one or more wheels (e.g., wheels 12). In some implementations, the vision system 90, including the camera 96, may identify the location of a stem hole 126 on the wheel and transmit the location of the stem hole 126 to the second robot 26. The robot 26 may position itself to install a first part (e.g., valve stem 14) onto a first wheel 12-1 and subsequently reposition itself to install a second part (e.g., tire pressure sensor 16) onto a second wheel 12-2.

At the assembly station, a stemming system 100 may install one or more parts (e.g., valve stems 14 or tire pressure sensors 16) onto a wheel. For example, during the installation of a part (e.g., valve stems 14 or tire pressure sensors 16) onto a wheel, the alignment device 124 may engage the wheel 12 and apply a force F1 extending towards the conveyor 86. An actuator (not shown) may apply a force F2 on the end effector 118 causing the part to engage the wheel 12. The force F2 may be opposite the force F1, thereby ensuring that the wheel remains stationary during the installation process. In some implementations, the actuator is controlled by precision regulated air. The system 10 may include one or more sensors (e.g., a load cell, linear transducer and/or accelerometer) to determine whether the part (e.g., valve stems 14 or tire pressure sensors 16) is properly installed in the wheel 12. A further discussion of the stemming system 100, including various configurations and functions thereof, may be found in commonly owned U.S. Pat. No. 11,472,240, entitled "System and Method for Stemming a Wheel," which is hereby incorporated by reference in its entirety.

With reference to FIGS. 6-8, after installation of the part(s) (e.g., valve stems 14 or tire pressure sensors 16) onto the wheel, the rollers 92 may move the wheel along the conveyor 86. Hard stops and centering devices (e.g., alignment pins 88) can maintain a location and/or alignment of the wheel relative to the conveyor 86.

After the second robot 26 removes a plate (e.g., the plate 64) from a dock (e.g., the first dock 58-1), and/or while the second robot 26 is installing a first part (e.g., valve stem 14) onto the first wheel 12-1 or a second part (e.g., tire pressure sensor 16) onto the second wheel 12-2, the first robot 24 may simultaneously load one or more (e.g., all) of the nests 68 of another dock (e.g., the second dock 58-2) with parts (e.g., valve stems 14 and/or tire pressure sensors 16) as previously described.

The dual-staged (e.g., two or more stations, such as staging station 20 and assembly station 22, and/or two or more docks, such as dock 58-1 and dock 58-2) system and method described herein allows for (a) simultaneous (i) assembly of parts (e.g., valve stems 14 or tire pressure sensors 16) onto wheels with the second robot 26 and (ii) loading of parts (e.g., valve stems 14 or tire pressure sensors 16) onto docks (e.g., docks 58) with the first robot 24, as illustrated in FIGS. 1 and 8, and (b) simultaneous (i) placement of plates (e.g., plate 64) onto docks (e.g., first dock 58-1) and (ii) removal of plates (e.g., plate 64) from docks (e.g., second dock 58-2), thereby increasing the efficiency of the wheel assembly method.

The following Clauses provide an exemplary configuration for a wheel assembly system and related methods, as described above.

Clause 1: A system comprising: a docking station including a first dock and a second dock, the first dock configured to removably-receive a first plate configured to removably-receive a first plurality of parts, the second dock configured to removably-receive a second plate configured to removably-receive a second plurality of parts; and a robot including an end effector configured to engage the first plate and the second plate.

Clause 2: The system of clause 1, wherein the first dock includes a first attachment fixture and a second attachment fixture, the first attachment fixture configured to receive a first part of the first plurality of parts, the second attachment fixture configured to receive a second part of the first plurality of parts.

Clause 3: The system of clause 2, wherein the first dock includes a base and a pair of arms extending from the base.

Clause 4: The system of clause 3, wherein the first dock includes a sensor coupled to the base and configured to sense a location of the first part.

Clause 5: The system of any of clauses 1 through 4, wherein the end effector includes a first engagement member and a second engagement member, the first engagement member configured to engage the first plate, the second engagement member configured to engage the second plate when the first engagement member engages the first plate.

Clause 6: The system of any of clauses 1 through 5, further comprising the first plate including a first peripheral tab and a second peripheral tab, wherein the first dock includes a first attachment fixture configured to receive the first peripheral tab, and a second attachment fixture configured to receive the second peripheral tab.

Clause 7: The system of clause 6, wherein the robot further comprises a first alignment device opposing the first peripheral tab and a second alignment device opposing the second peripheral tab.

Clause 8: The system of any of clauses 1 through 7, wherein the first plurality of parts includes a first type of part, and the second plurality of parts includes a second type of part different than the first type of part.

Clause 9: A method comprising: positioning, with a first robot, a first part on a first plate disposed at a docking station; securing a second robot to a second plate disposed at the docking station; installing, with the second robot, a second part on a wheel; releasing the second robot from the second plate at the docking station; and securing the second robot to the first plate at the docking station.

Clause 10: The method of clause 9, wherein installing, with the second robot, the second part on the wheel is simultaneous with positioning, with the first robot, the first part on the first plate.

Clause 11: The method of any of clauses 9 through 10, wherein securing the first plate to the second robot is simultaneous with releasing the first plate from the second robot.

Clause 12: The method of any of clauses 9 through 11, wherein installing, with the second robot, the second part on the wheel includes: applying, with the second robot, a first force in a first direction on the wheel; and applying, with the second robot, a second force in a second direction on the wheel, wherein the second direction is opposite the first direction.

Clause 13: The method of any of clauses 9 through 12, further comprising sensing a location of the first part.

Clause 14: The method of any of clauses 9 through 13, further comprising installing, with the second robot, a third part on the wheel.

Clause 15: The method of any of clauses 9 through 14, further comprising positioning, with the first robot, a fourth part on the first plate disposed at the docking station simultaneous with installing, with the second robot, the third part on the wheel.

Clause 16: The method of any of clauses 9 through 14, wherein the first part is a first type of part, and the second part is a second type of part different than the first type of part.

Clause 17: A docking assembly comprising: a first dock; a first plate removably-disposed on the first dock, the first plate including a first nest and a second nest, the first nest and the second nest each configured to removably-receive a first part and a second part; a second dock; and a second plate removably-disposed on the second dock, the second plate including a third nest and a fourth nest, the third nest and the fourth nest each configured to removably-receive the first part and the second part.

Clause 18: The docking assembly of claim 17, wherein: the first plate includes a first peripheral tab and a second peripheral tab, the first nest is disposed on the first peripheral tab, and the second nest is disposed on the second peripheral tab.

Clause 19: The docking assembly of any of clauses 17 through 18, further comprising a first sensor configured to sense a position of the first nest, and a second sensor configured to sense a position of the second nest.

Clause 20: The docking assembly of clause 19, wherein the first dock includes a first attachment fixture having a first base and a first pair of arms extending from the first base, and wherein the first sensor is disposed on the first base, and wherein the second dock includes a second attachment fixture having a second base and a second pair of arms extending from the second base, and wherein the second sensor is disposed on the second base.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
a docking station including:
a first dock;
a first plate configured to be removably-received by the first dock and configured to removably-receive a first plurality of parts, wherein:
the first plate includes a first peripheral tab and a second peripheral tab, and
the first dock includes (i) a first attachment fixture configured to receive the first peripheral tab and (ii) a second attachment fixture configured to receive the second peripheral tab; and
a second dock configured to removably-receive a second plate configured to removably-receive a second plurality of parts; and
a robot including an end effector configured to engage the first plate and the second plate.

2. The system of claim 1, wherein:
the first attachment fixture is configured to receive a first part of the first plurality of parts, and
the second attachment fixture is configured to receive a second part of the first plurality of parts.

3. The system of claim 2, wherein the first attachment fixture includes a base and a pair of arms extending from the base.

4. The system of claim 3, wherein the first dock-first attachment fixture includes a sensor coupled to the base and configured to sense a location of the first part.

5. The system of claim 1, wherein;
the end effector includes a first engagement member and a second engagement member,
the first engagement member is configured to engage the first plate, and
the second engagement member is configured to engage the second plate when the first engagement member engages the first plate.

6. The system of claim 1, wherein the robot further includes a first alignment device opposing the first peripheral tab and a second alignment device opposing the second peripheral tab.

7. The system of claim 1, wherein the first plurality of parts includes a first type of part, and the second plurality of parts includes a second type of part different than the first type of part.

* * * * *